United States Patent [19]

Funakubo

[11] 3,800,633
[45] Apr. 2, 1974

[54] METHOD OF MANUFACTURING BIMETALLIC HIGH-SPEED CUTTING TOOLS

[75] Inventor: Toshiei Funakubo, Odawara, Japan

[73] Assignee: Kabushiki-Kaisha Eishin, Tokyo, Japan

[22] Filed: July 25, 1972

[21] Appl. No.: 274,842

Related U.S. Application Data

[62] Division of Ser. No. 106,681, Jan. 15, 1971, Pat. No. 3,736,828.

[52] U.S. Cl. ............................................... 76/112
[51] Int. Cl. ............................................ B23d 65/00
[58] Field of Search............ 76/112, 101 A; 29/95 B

[56] References Cited
UNITED STATES PATENTS

| | | | |
|---|---|---|---|
| 3,261,384 | 7/1966 | Henderson | 29/95 B |
| 2,958,240 | 11/1960 | Segal | 76/112 |
| 2,528,226 | 10/1950 | Hildebrant | 76/112 X |
| 2,318,549 | 5/1943 | Wilkie | 29/95 B |

Primary Examiner—Leonidas Vlachos
Attorney, Agent, or Firm—Shlesinger, Fitzsimmons & Shlesinger

[57] ABSTRACT

A bimetallic high-speed cutting tool having a series of spaced teeth provided on one of its longitudinal edges is manufactured by providing each tooth at its forward top end with a cut-out portion on which a tip of super-hard material, molded before being sintered into a shape substantially equal to a desired final configuration, and having as cutting edges sharp square corners, is welded or brazed, so that the machining of said tip to said desired final configuration, after it has been welded or brazed to the tooth body is minimized, the super-hard materials constituting said tip being selected from those having such hardness and flexural strength as not to be affected by the heat applied thereto when the tip is welded or brazed firmly onto the tooth body.

3 Claims, 3 Drawing Figures

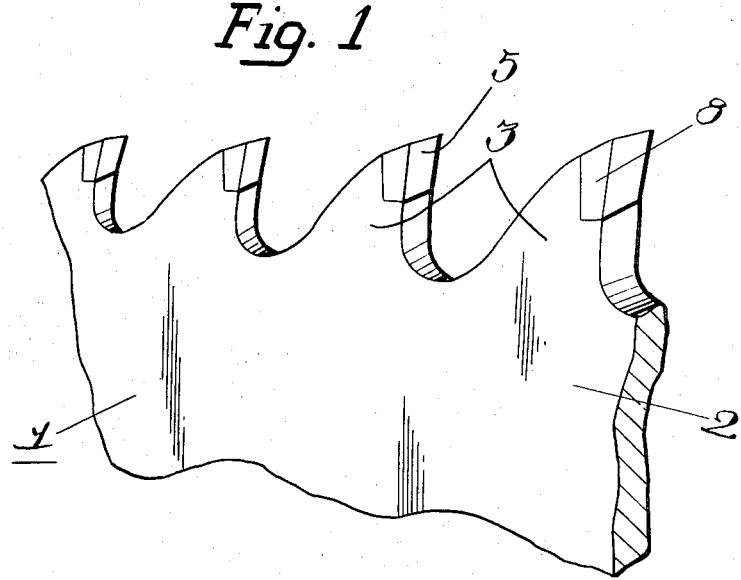
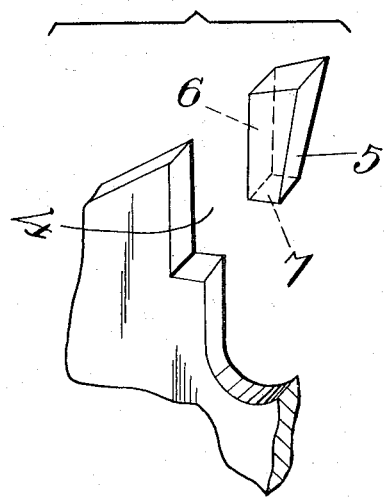
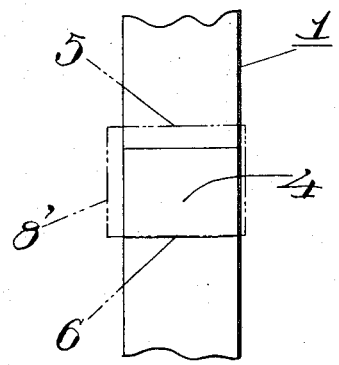

METHOD OF MANUFACTURING BIMETALLIC HIGH-SPEED CUTTING TOOLS

This application is a division of my copending application Ser. No. 106,681, filed Jan. 15, 1971 now U.S. Pat. No. 3,736,828.

This invention relates to a method of producing a bimetallic high-speed cutting tool which comprises forming a series of teeth with a desired space therebetween along one of longitudinal edges of a base made of a coil or band of flexible back-forming strip material, providing a cut-out portion in each tooth having an L-shaped configuration, when viewed in the plane of the tool, welding or brazing to the back and bottom of the cut-out portion a substantially square cutting tip made from super-hard materials selected from alloys predominantly containing tungsten carbides, alloys of multicarbides containing as their major portions tungsten carbides and as their minor portions titanium and/or tantalum carbides, alloys of carbides predominantly containing tantalum and/or vanadium carbides, and ceramics perdominantly containing aluminum oxides or silicon dioxides, said tip being formed, by molding or melting the powdery constituents of the super-hard materials to a desired configuration which has a sharp cutting edge and being brought to final shape and sharpness through a minor machining operation after the tip has been welded or brazed to the tool body, the super-hard materials, which form the sharp cutting tip, having a Vickers hardness of about 1,300 Hv. to 1,550 Hv. and a flexural strength of about 210 Kg./mm$^2$ to 160 Kg./mm$^2$ so that the super-hardness proper of the materials will not adversely be affected by the temperature at which a welding or brazing medium which has a Vickers hardness of about 450 Hv. to 500 Hv., can be melted to form a binding surface between the tip and tooth.

Though a considerable number of experiments have been conducted and a number of new methods have been developed for affording the edges of the teeth of a cutting blade, including a band saw blade, high heat and abrasion-resistance and consequently for giving the saw blade prolonged cutting efficiency, the saw blade made in accordance with the present invention is, however, based on entirely new knowledge and is produced by a method entirely different from those disclosed in the prior art.

One prior art method relating to armouring cutting edges of saw blades is described in U.S. Pat. No. 3,104,562 which discloses a method for armorung the edges of cutting teeth of a saw blade, in which a spherical tip made from a super-hard alloy, such as tungsten carbide, is fitted into a circular pocket formed at the edge of each cutting tooth and is brazed therein. This method is almost impracticable on an industrial basis, becuase it requires extremely elaborate technics and equipment to produce tips of such small dimensions by molding and sintering powdery constituents of super-hard alloy, and moreover, it is nearly impossible to economically finish the tip brazed to the edge of cutting teeth to a desired configuration.

Another method of manufacture of a high-speed cutting band saw blade, in which cutting teeth are formed after armouring a carbon steel backing band, is shown in U.S. Pat. No. 3,315,548. Said patent teaches a method of manufacturing an armoured high-speed cutting saw blade, which in brief comprises welding a wire of high-speed cutting tool steel to one edge of a carbon steel backing band and cutting said bimetallic edge to form along said edge teeth of the desired size and shape. This method has, however, the draw-back that only the tips of the teeth are formed of high-speed cutting tool steel and the remaining greater part of said tool steel welded to the edge is cut off from the blade, whereby the expensive tool steel loss becomes inevitably great.

The reasons why such methods have comparatively poor productivity are due to the fact that it is extremely difficult to mold and sinter powdery constitutents of super-hard alloy materials into a tip of extremely small dimensions, which correspond approximately to the desired final configuration of the tip and its cutting edges and need little additional machining, and to the fact that the internal structure of a tip made from super-hard alloy is adversely affected by the welding or brazing heat, resulting in diminution of hardness and flexural strength to such an extent that the tip can hardly stand the high-speed cutting operation. Lowering of welding or brazing temperature so as to avoid the deterioration of the hardness and flexural strength of the tip, on the other hand, inevitably brings about lowering of the hardness about the welding or brazing portions to be formed between the tip and the tooth body, resulting in said portions not being strong enough to stand the high-speed cutting operation.

In order to obtain a super-hard alloy tip having the desired configuration and sharp corners, the present inventor has tried to cut, to a desired size, a material made by molding and sintering powdery constituents of super-hard alloy, such as tungsten carbides, into strip form having a thickness corresponding to that of a saw blade, but such trial has ended in failure, because upon cutting the super-hard alloy of strip form into pieces, the sharp corners of the alloy were destroyed and it was nearly impossible to obtain, through such cutting operation, tips provided with sharp edges which can act as sharp cutting corners when welded or brazed to a tool body. It should be noted, therefore, that one of the features of the present invention lies in that in order to obtain tips of super-hard materials having closely approximate shapes or configuration which can act as sharp cutting edges when welded or brazed to cut-out portions of blade teeth, the powdery constituents of super-hard alloys, which are preliminarily molded, are formed into the desired shapes or configurations by cutting in advance of finally sintering them, and are sintered after the formation of the preliminarily molded powdery constitutents into tips of a desired size. It should be noted also, as another feature of the present invention, that tips having comparatively small dimensions thus obtained are selected and made from such super-hard materials, to a hardness and flexural strength which is not affected by the heat to be applied thereto when the tips are welded or brazed onto the tooth bodies.

It is, therefore, an object of the present invention to provide a bimetallic high-speed cutting tool having a series of teeth provided on one of its longitudinal edges with a desired distance therebetween, the body of each tooth being provided at its forward top end with a cut-out portion on which a tip of super-hard material, molded and sintered to a shape substantially equal to a desired final configuration and having cutting corners, is welded or brazed so that the machining work required to form said tip to said desired final configuration is minimized, the super-hard materials constituting said tip being selected from those having such hardness and flexural strength as not to be affected by the heat applied thereto in the welding or brazing of the tip to the tooth body.

In the accompanying drawing in which a preferred embodiment of the present invention is illustrated;

FIG. 1 is a perspective view of a part of a blade in the form of a band saw blade and made according to the process of the present invention;

FIG. 2 is an exploded perspective view of an enlarged scale showing a tooth body having a cut-out portion with a tip of substantially square shape; and FIG. 3 is a plan view showing the clearance between the cut-out portion formed in a tooth body and a tip when the latter is mounted on the former for welding or brazing thereto.

Referring now to the drawing, 4 denotes a cut-out portion formed in the forward top end of each tooth of a saw blade 1. Each cut-out portion has a substantially L shape when viewed in the plane of the base plate 2 of the saw blade 1. The teeth are arranged in series with a desired distance therebetween. A cutting tip 5 made from super-hard material, such as tungsten carbide and in the form of a substantially square block is mounted in each cut-out portion. Each tip 5 has a back surface 6 and a bottom surface 7, by which it is welded or brazed to the cut-out portion, and is provided with a configuration and dimensions substantially equal to those said tip is to have after it is welded or brazed onto the cut-out portion and slightly machined along its sides. In other words, said tip is primarily provided with such a configuration as to have sharp cutting edges wih only little additional machining. A tip made from super-hard materials and provided with sharp corners is obtained, in the present invention, by shaping powdery constitutents of the material into the desired configuration before finally sintering it. In the concrete, such tips have been obtained, for example, by means of a cold press sintering method, in which powdery constituents of alloys mixed at a specific ratio are preliminarily pressed, cut into a desired configuration, and finally sintered.

Though the cutting tip 5 should preferably be provided with dimensions which exactly correspond to those which can act as cutting edges when welded or braazed to the blade, it is afforded, in practice as shown in FIG. 3 with a clearance 8' which extends transversely to the plane of blade and has a length corresponding to about two tenths of the whole width, because the tip can hardly be located exactly onto the cut-out portion at its side which extends transversely to the plane of blade and not be supported by any surfaces of the cut-out portion. It has been found through experiments that a welding or brazing medium, to form a binding surface between a tip 5 and its cut-out portion 4, has to be provided with a Vickers hardness of about 450 to 500 Hv., to prevent the tip and the cut-out portion from separating from each other at the high-speed cutting operation and also to insure the flexibility of the blade 1 as a whole. In order to afford the welded or brazed portion with the aforementioned hardness, it has been found also that the welding or brazing medium should be one which will solidify after heating it to a temperature of about 1,300° C. It has also been found that super-hard materials, whose structures will not be affected by such a temperature, should have a Vickers hardness of about 1,300 to 1,550 Hv. and a flexural strength of about 210 Kg./mm$^2$ to 160 Kg./mm$^2$.

In order to assist in better understanding of the present invention, some preferred embodiments thereof, particularly in the case of a band saw blade, are described hereinafter.

EXAMPLE 1.

In a backing strip 2 of carbon tool steel of SK 6 containing about 0.8 percent of carbon and having a thickness of 1.05 mm and a width of 32mm, there is provided along one longitudinal edge a series of teeth, each having at its forward top end a cut-out portion 4 having (1) a bottom surface of the length of 1.05 mm at its side extending transversely to the plane of the blade, and (2) of a length of about 0.8 mm at the side parallel to the longitudinal direction of blade, and (3) a back surface having the height of about 1.5 mm. A tip made from an alloy of tungsten carbides (containing 79 percent of W, 6 percent of AiC and TaC and 15 percent of Co) having a Vickers hardness of about 1,300 Hv. and a flexural strength of about 210 Kg./mm$^2$ was brazed onto the aforementioned cut-out portion by first applying on the back and bottom surfaces of the cut-out portion a brazing medium predominantly containing nickel which was mixed with powdery flux and heated up to about 880° C, and subsequently mounting the tip onto the cut-out portion and heating up to about 1,300° C. Said tip was provided with a bottom surface 7 of 1.3 mm at its side transverse to the plane of the blade and of 0.8 mm at its side parallel to the plane of the blade, and with a back surface having a height of 1.5 mm and a top surface of 1.0 mm at its side parallel to the plane of blade. The clearance 8' of about 0.25 mm provided on the tip at its side extending transversely to the plane of blade was machined after it had been brazed to the cut-out portion. The Vickers hardness of the brazed portion was measured as about 450 to 500 Hv. It was confirmed through an experimental cutting operfation that the hardness and flexural strength of the tips were not affected by the aforementioned brazing temperature and the brazed portion was sufficiently strong enough to stand the cutting operation. The experimental cutting operation conducted with the band saw blade obtained as described above was such that the blade mounted on a band sawing machine was rotated at the speed of 96 m/sec. to cut a steel material of S45C having the diameter of 200 mm. The cutting depth of each tooth into the material was about 0.2 mm and the material was cut in about 140 seconds.

EXAMPLE 2.

A band saw blade having a structure and construction the same as those described in the foregoing Example 1 and produced in a similar manner but provided with tips made from an alloy steel containing 82 percent of W, 10 percent TaC and AiC and 8 percent of Co and having a Vickers hardness of about 1,550 Kg./mm$^2$ has also shown extremely good cutting efficiency.

Having thus described my invention, what I claim is:

1. A method of producing a bimetallic high-speed cutting tool, which comprises forming on a base strip of flexible material a series of teeth which are spaced from one another along one of the longitudinal edges of said strip, providing a cut-out portion in each tooth that has an L-shaped configuration, when viewed in the longitudinal plane of the tooth, compacting a powdery super-hard material to a shape conforming approximately to the cut-out portion of each tooth, cutting the compacted material to the desired configuration, and then sintering the compacted material to form a cutting tip of generally truncated pyramidal shape, applying a brazing medium to the back and bottom portions of the cut-out portion of each tooth, heating the brazing medium, mounting a cutting tip on the cut-out portion of each tooth so that the bottom of the tip seats on the braze-coated bottom of said cut-out portion and the back of the tip seats against the braze-coated back of the cut-out portion, then heating the brazing medium to a higher temperature than the initial heat but below the melting temperature of the tip to braze the tip to the tooth on which it is seated, and then machining each tip to provide sharp cutting edges thereon.

2. A method of producing a high speed cutting tool as claimed in claim 1, wherein the tips are initially molded to be slightly wider than the cut-out portions of the flexible base strip, and machining each tip, after it has been brazed to the associated cut-out portion to conform it precisely to the desired configuration.

3. A method of producing a high-speed cutting tool as claimed in claim 2, wherein the tips have a Vickers hardness of about 1,300 Hv. to 1,550 Hv. and a flexural strength of about 210 Kg./mm$^2$ to 160 Kg/mm$^2$, the brazing medium has a Vickers hardness of about 450 Hv. to 500 Hv., and the brazing medium is initially heated up to about 800°C., and the brazing is effected at about 1,300°C.

* * * * *